(12) United States Patent
Song et al.

(10) Patent No.: US 8,090,487 B2
(45) Date of Patent: Jan. 3, 2012

(54) ON/OFF CONTROL METHOD FOR AIR BLOWER OF FUEL CELL VEHICLE

(75) Inventors: Yo In Song, Gyeonggi-do (KR); Sung Gone Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 322 days.

(21) Appl. No.: 12/477,324

(22) Filed: Jun. 3, 2009

(65) Prior Publication Data

US 2010/0131138 A1      May 27, 2010

(30) Foreign Application Priority Data

Nov. 25, 2008    (KR) .................. 10-2008-0117744

(51) Int. Cl.
*G05D 3/00*         (2006.01)
(52) U.S. Cl. ............... 701/22; 429/13; 429/23; 429/24; 429/25
(58) Field of Classification Search .................. 701/22
See application file for complete search history.

(56) References Cited

U.S. PATENT DOCUMENTS

| | | | | |
|---|---|---|---|---|
| 6,977,119 | B2 * | 12/2005 | McElroy | 429/415 |
| 7,377,345 | B2 * | 5/2008 | Hasuka et al. | 180/65.31 |
| 2004/0131902 | A1 * | 7/2004 | Frank et al. | 429/21 |
| 2007/0148512 | A1 * | 6/2007 | Goto et al. | 429/23 |
| 2007/0264547 | A1 * | 11/2007 | Ojima et al. | 429/23 |
| 2008/0081224 | A1 | 4/2008 | Burch et al. | |
| 2008/0187804 | A1 * | 8/2008 | Arthur et al. | 429/25 |

FOREIGN PATENT DOCUMENTS

| | | |
|---|---|---|
| JP | 2006-115640 | 4/2006 |
| JP | 2007-195272 | 8/2007 |
| JP | 2007-323997 | 12/2007 |
| KR | 10-2007-0109541 | 11/2007 |
| KR | 10-2008-0054008 | 6/2008 |

* cited by examiner

*Primary Examiner* — Thomas Black
*Assistant Examiner* — Shardul Patel
(74) *Attorney, Agent, or Firm* — Edwards Wildman Palmer LLP; Peter F. Corless

(57) ABSTRACT

On/off times of the air blower of a fuel cell hybrid vehicle equipped with a fuel cell as a main power source and a supercapacitor as an auxiliary power source are controlled to vary according to supercapacitor voltage, motor current, stack voltage and/or stack voltage rise/drop rate. Accordingly, the voltage of the fuel cell stack can be prevented from far exceeding a predetermined maximum voltage. Moreover, vehicle acceleration response during switching-off of the air blower can be improved.

4 Claims, 5 Drawing Sheets

ON/OFF CONTROL METHOD FOR AIR BLOWER OF FUEL CELL VEHICLE

CROSS-REFERENCE TO RELATED APPLICATION

This application claims under 35 U.S.C. §119(a) the benefit of Korean Patent Application No. 10-2008-0117744 filed Nov. 25, 2008, the entire contents of which are incorporated herein by reference.

BACKGROUND (a) Technical Field

The present disclosure relates to an on/off control method for an air blower of a fuel cell vehicle. More particularly, it relates to an on/off control method for an air blower of a fuel cell/supercapacitor hybrid vehicle, which can prevent the voltage of a fuel cell stack from exceeding a predetermined maximum voltage and improve vehicle acceleration response during switching-off of the air blower.

(b) Background Art

A fuel cell system is an electricity generation system that does not convert chemical energy of fuel into heat by combustion, but electrochemically converts the chemical energy into electrical energy in a fuel cell stack. Such a fuel cell system can be applied to the supply of electric power for small-sized electrical/electronic devices such as portable devices, as well as to the supply of electric power for industrial and household appliances and for vehicles.

One of the most attractive fuel cells for a vehicle is a proton exchange membrane fuel cell or a polymer electrolyte membrane fuel cell (PEMFC), which has the highest power density among known fuel cells. The PEMFC is operated in a low temperature and is able to start up in a short time and has a fast reaction time for power conversion.

The fuel cell stack included in the PEMFC comprises a membrane electrode assembly (MEA), a gas diffusion layer (GDL), a gasket, a sealing member, and a bipolar plate (separator). The MEA includes a polymer electrolyte membrane through which hydrogen ions are transported. An electrode/catalyst layer, in which an electrochemical reaction takes place, is disposed on each of both sides of the polymer electrolyte membrane. The GDL functions to uniformly diffuse reactant gases and transmit generated electricity. The gasket functions to provide an appropriate airtightness to reactant gases and coolant. The sealing member functions to provide an appropriate bonding pressure. The bipolar plate functions to support the MEA and GDL, collect and transmit generated electricity, transmit reactant gases, transmit and remove reaction products, and transmit coolant to remove reaction heat, etc.

The fuel cell stack is consisted of a plurality of unit cells, each unit cell including an anode, a cathode, and an electrolyte (electrolyte membrane). Hydrogen as a fuel is supplied to the anode ("fuel electrode", "hydrogen electrode", or "oxidation electrode") and oxygen containing air as an oxidant is supplied to the cathode ("air electrode", "oxygen electrode", or "reduction electrode").

The hydrogen supplied to the anode is dissociated into hydrogen ions (protons, $H^+$) and electrons ($e^-$) by a catalyst disposed in the electrode/catalyst layer. The hydrogen ions are transmitted to the cathode through the electrolyte membrane, which is a cation exchange membrane, and the electrons are transmitted to the cathode through the GDL and the bipolar plate.

At the cathode, the hydrogen ions supplied through the electrolyte membrane and the electrons transmitted through the bipolar plate react with the oxygen containing air supplied to the cathode to produce water. Migration of the hydrogen ions causes electrons to flow through an external conducting wire, which generates electricity and heat.

As a vehicle equipped with the above-described fuel cell, there has been developed a fuel cell/battery hybrid vehicle or a fuel cell/supercapacitor hybrid vehicle, in which a high voltage battery or a supercapacitor is used as a separate power source for providing the power required to drive a motor in addition to the fuel cell as a main power source in a large vehicle such as a bus as well as a small vehicle.

Especially, a fuel cell/supercapacitor hybrid vehicle which does not employ a power converter has been studied, and the fuel cell/supercapacitor hybrid vehicle has many advantages such as high fuel efficiency (high regenerative braking, high efficiency of supercapacitor, and without the use of the power converter), an increase in durability of the fuel cell, high reliability control (automatic power assist and automatic regenerative braking function), and the like.

In the hybrid vehicle in which the fuel cell and the supercapacitor are directly connected, the fuel cell continuously outputs power at a constant level during driving. If there is surplus power, the supercapacitor is charged with the surplus power, whereas, if there is insufficient power, the supercapacitor supplies the insufficient power to drive the vehicle.

FIG. 1 is a diagram showing a structure of a fuel cell/supercapacitor hybrid system. Reference numeral 10 denotes a fuel cell, reference numerals 20 and 21 denote a supercapacitor and a supercapacitor initial charging device, and reference numeral 30 denotes an air blower.

FIG. 2 is a graph showing performance deterioration rates obtained by reducing the maximum voltage of a fuel cell stack to OCV (about 1.0 V), 0.95 V, 0.9 V, and 0.85 V. As shown in FIG. 2, fuel cell performance is less reduced with the passage of time if the maximum voltage of the fuel cell stack is lower and the recovery rate of regenerative energy during the switching-off of the air blower is increased.

FIG. 3 is a diagram showing an on/off control map of a conventional air blower. When the supercapacitor voltage is above V1, the air blower of the fuel cell system is switched off, and the supercapacitor prevents the voltage of the fuel cell stack from rising. At this time, the fuel cell/supercapacitor hybrid vehicle is driven only by the energy of the supercapacitor, and the recovery rate of regenerative braking energy is increased.

On the other hand, when the supercapacitor voltage is below V2, the air blower is switched on and, at this time, the voltage of the fuel cell stack is increased to supply energy to the vehicle. In this case, when the vehicle is decelerated, the supercapacitor is charged, and thus the supercapacitor voltage is increased. Subsequently, when the supercapacitor voltage becomes above V1, the air blower of the fuel cell system is switched off again.

However, the conventional system has the following problems. The conventionally system much exceeds the maximum voltage of the fuel cell stack (above 20 to 30 V). More particularly, if excessive regenerative braking occurs when the supercapacitor voltage is above V1 and the air blower is switched on, it is difficult to prevent the voltage of the fuel cell stack from rising by the supercapacitor, even immediately after the air blower is switched off. In addition, the conventional system shows a low vehicle acceleration response during maximum acceleration when the air blower is switched off. More specifically, the vehicle acceleration response is low during maximum acceleration, if the supercapacitor voltage is slightly higher than V2 (0 to 20V) during the switching-off of the air blower. Moreover, even when the air blower is switched on, it takes about 1 to 2 seconds for the fuel cell system to operate normally.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides an on/off control method for an air blower of a fuel cell-supercapacitor hybrid vehicle, which can prevent the voltage of a fuel cell stack from exceeding a predetermined maximum voltage and improve vehicle acceleration response during switching-off of the air blower.

In one aspect, the present invention provides an on/off control method for an air blower of a fuel cell hybrid vehicle equipped with a fuel cell as a main power source and a supercapacitor as an auxiliary power source, the method characterized in that on/off times of the air blower are controlled to vary according to supercapacitor voltage and motor current based on a map.

In another aspect, the present invention provides an on/off control method for an air blower of a fuel cell hybrid vehicle equipped with a fuel cell as a main power source and a supercapacitor as an auxiliary power source, the method characterized in that on/off times of the air blower are controlled by a control map so as to vary according to stack voltage, stack voltage rise rate, and stack voltage drop rate.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
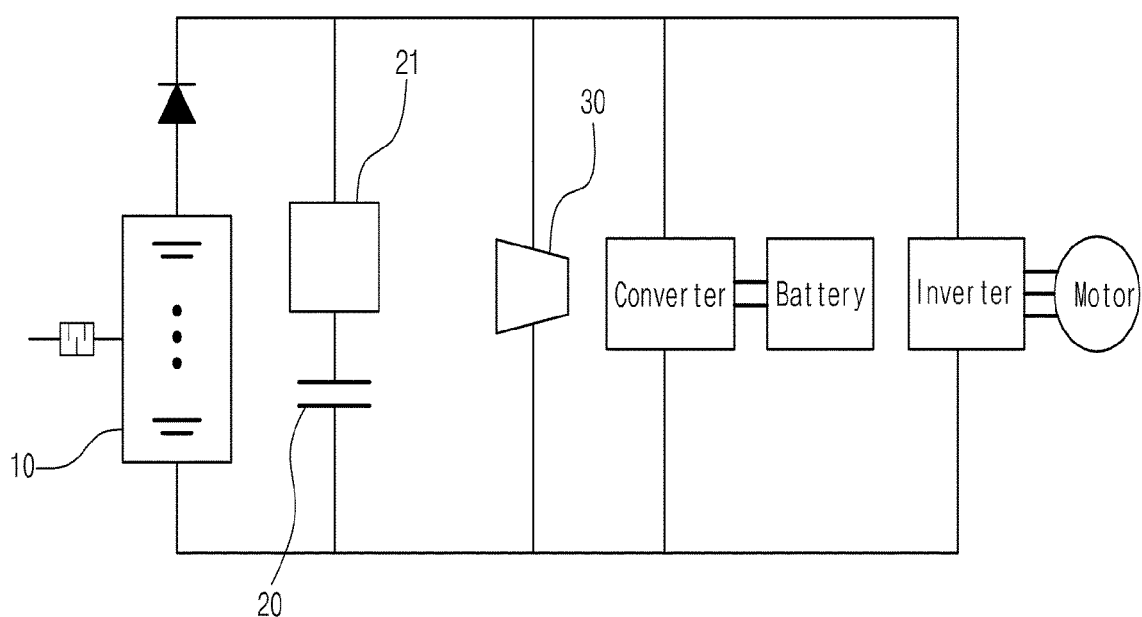
FIG. 1 is a diagram showing a structure of a fuel cell/supercapacitor hybrid system.
Figure 2:
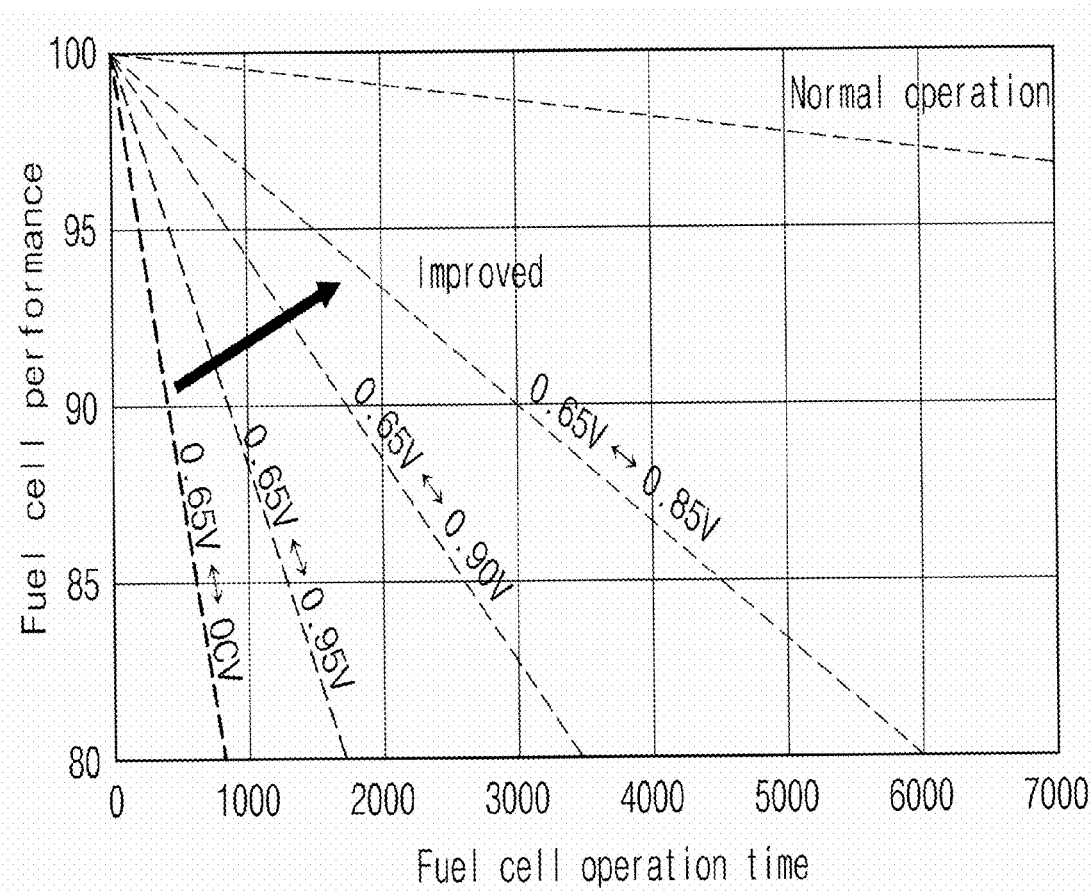
FIG. 2 is a graph showing performance deterioration rates obtained by reducing the maximum voltage of a fuel cell stack.
Figure 3:
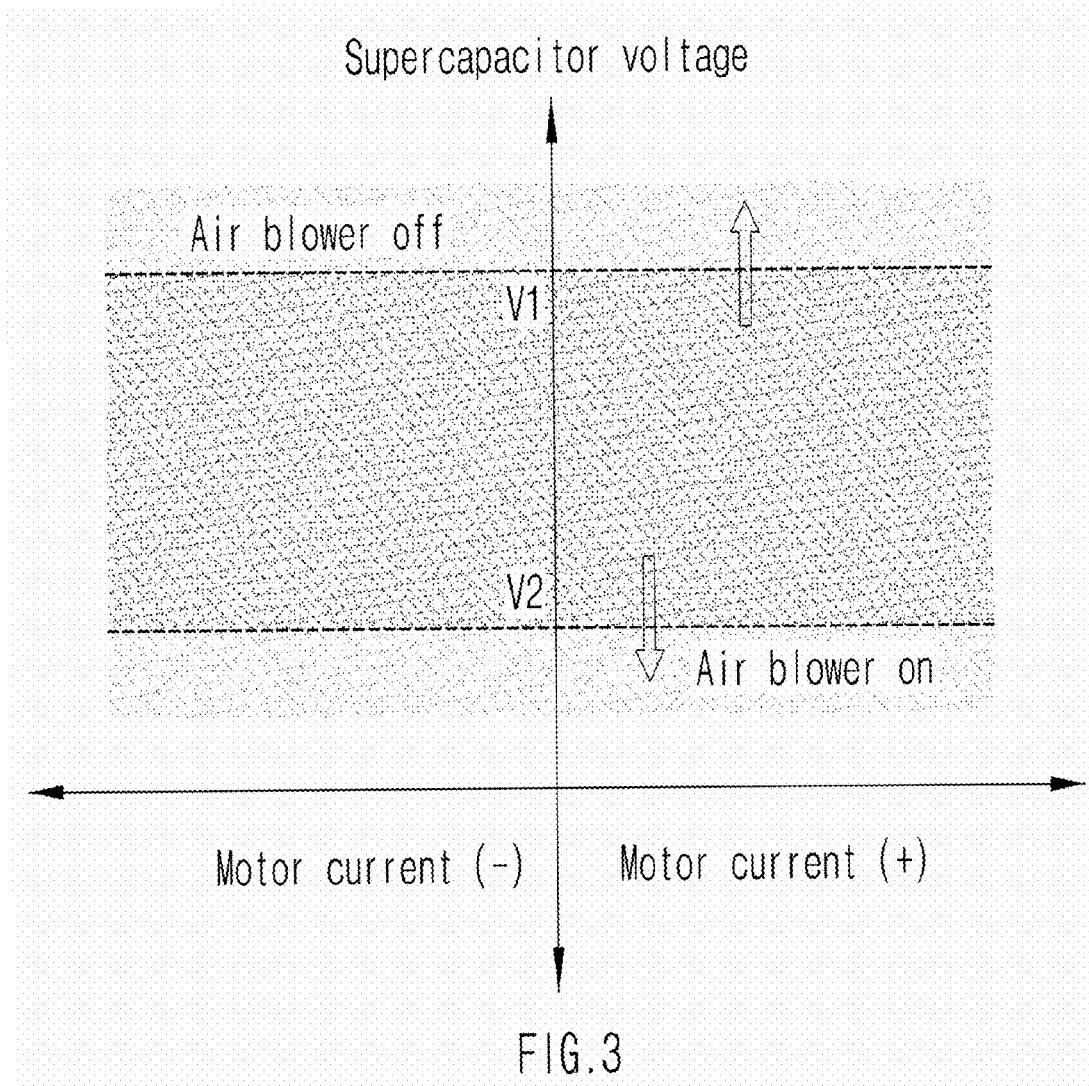
FIG. 3 is a diagram showing an on/off control map of a conventional air blower.

Reference numerals set forth in the Drawings includes reference to the following elements as further discussed below:

10: fuel cell (stack)
20: supercapacitor
21: supercapacitor initial charging device
30: air blower It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an on/off control method for an air blower of a fuel cell-supercapacitor hybrid vehicle, which can prevent the voltage of a fuel cell stack from exceeding a predetermined maximum voltage and improve vehicle acceleration response during switching-off of the air blower.

Figure 4:
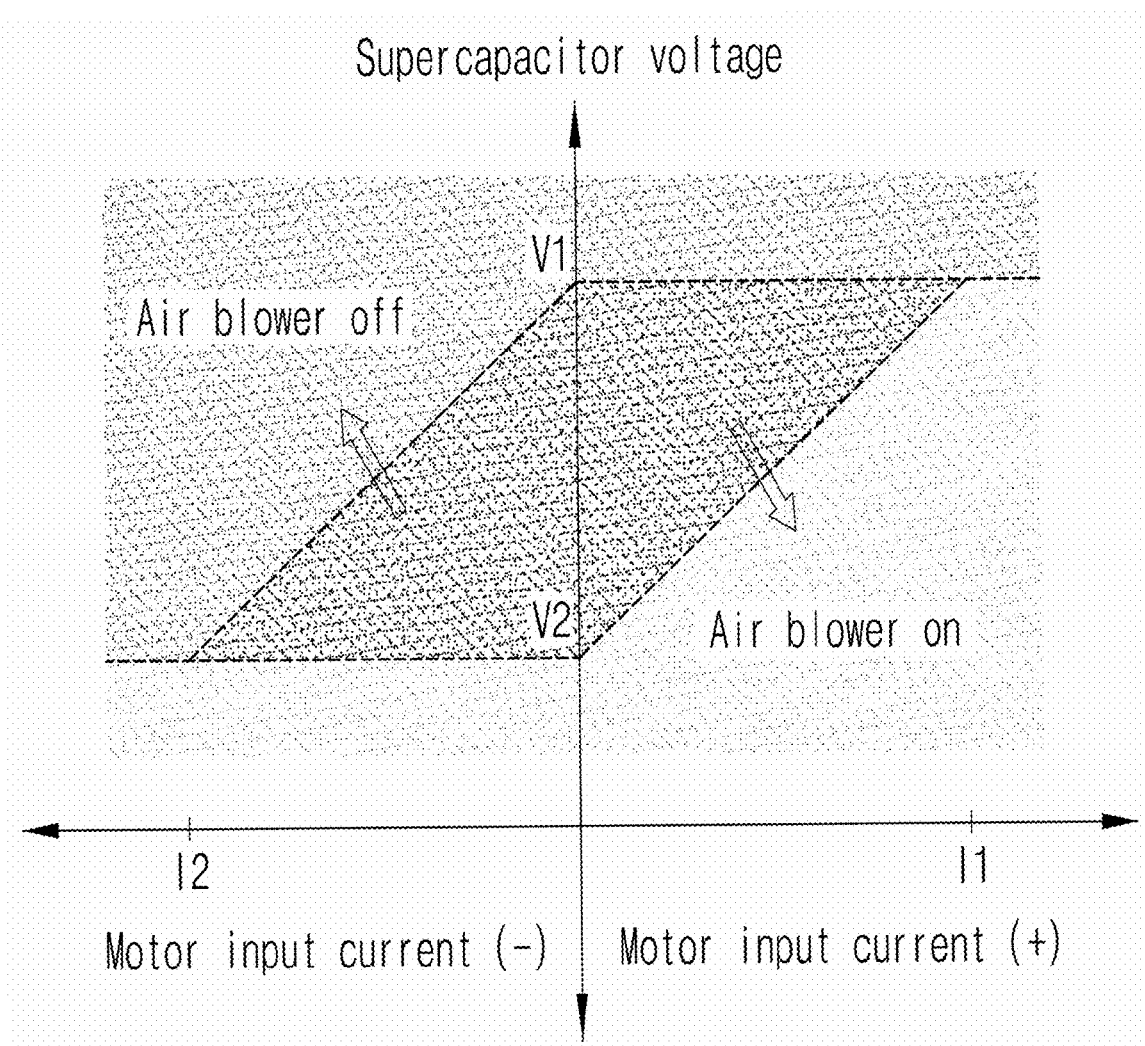
FIG. 4 is a diagram showing an on/off control map of an air blower in accordance with a preferred embodiment of the present invention.

FIG. 4 is a diagram showing an on/off control map of an air blower in accordance with a preferred embodiment of the present invention, in which an on/off control method for an air blower is shown.

As shown in FIG. 4, the on/off control for the air blower is performed according to supercapacitor voltage and motor current in order to control the maximum voltage of the fuel cell stack.

In the case where motor input current is 0 A, if the supercapacitor voltage is greater than V1, the air blower is set to be switched off and, if the supercapacitor voltage is smaller than V2, the air blower is set to be switched on.

When the motor input current is greater than 0 A, the switching-on time of the air blower is changed according to the motor input current. In particular, during vehicle acceleration, the air blower is set to be switched on at a higher supercapacitor voltage if the motor input current is higher (see the inclined line on the right-side plane).

On the contrary, when the motor input current is smaller than 0 A, the switching-off time of the air blower is changed according to the motor input current. More specifically, during vehicle braking, the air blower is set to be switched off at a lower supercapacitor voltage if motor regenerative current is higher (see the inclined line on the left-side plane).

Controlling the switching-on/off of the air blower according to the supercapacitor voltage and the motor current in the above manner offers the following advantages. First, during vehicle braking, by controlling the air blower to be switched off at a lower supercapacitor voltage at a higher motor regenerative current, the voltage of the fuel cell stack can be prevented from far exceeding a predetermined maximum voltage. For instance, the voltage of the fuel cell stack exceeds the predetermined maximum voltage by 10 V or less. Moreover, during vehicle acceleration, by controlling the air blower to be switched on at a higher supercapacitor voltage at a higher motor input current, vehicle acceleration response during switching-off of the air blower can be improved.

Figure 5:
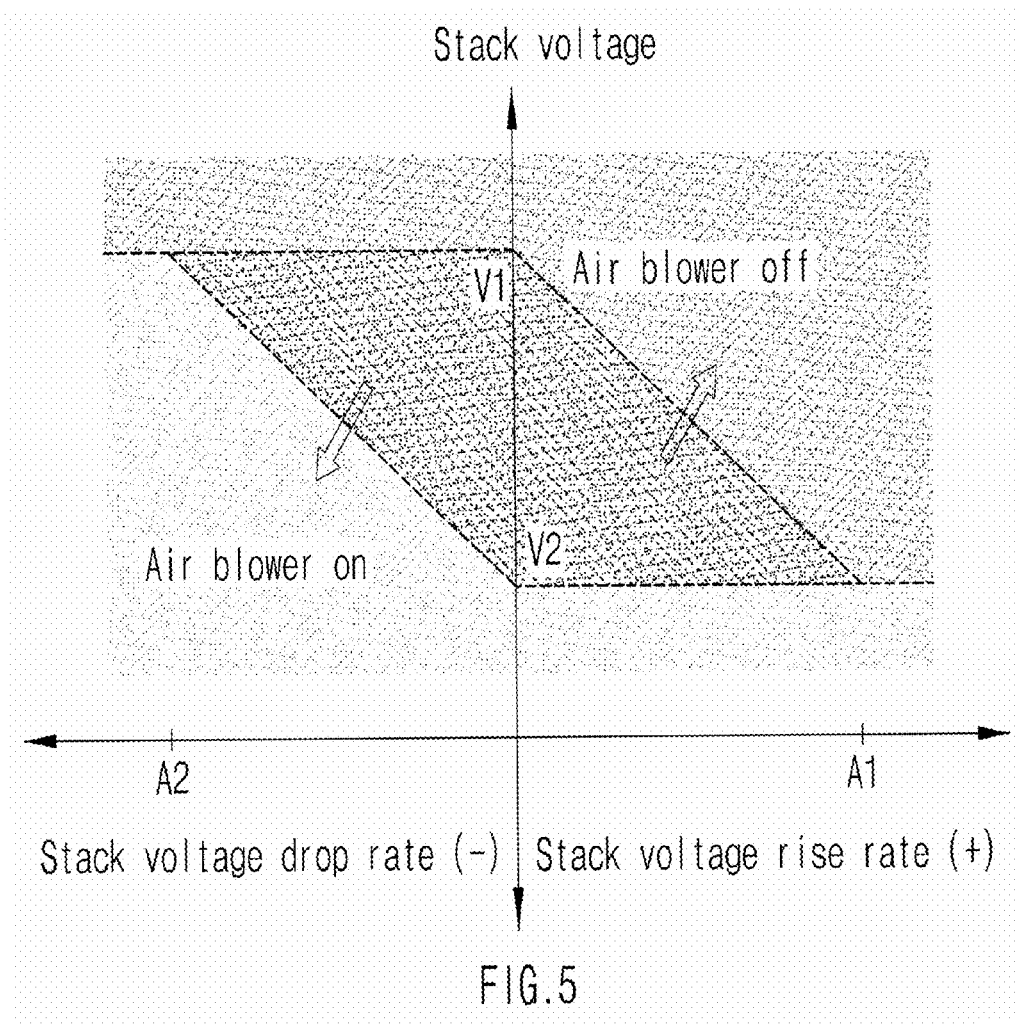
FIG. 5 is a diagram showing an on/off control map of an air blower in accordance with another preferred embodiment of the present invention.

Meanwhile, FIG. 5 is a diagram showing an on/off control map of an air blower in accordance with another embodiment of the present invention, in which an on/off control method for an air blower is shown.

As shown in FIG. 5, the on/off control for the air blower is performed according to (fuel cell) stack voltage and (fuel cell) stack voltage rise/drop rate in order to control the maximum voltage of the fuel cell stack in another preferred embodiment of the present invention.

The switching-on time of the air blower varies according to the stack voltage drop rate. More particularly, the air blower is set to be switched on at a higher stack voltage if the stack voltage drop rate is higher (see the inclined line on the left-side plane).

On the contrary, the switching-off time of the air blower varies according to the stack voltage rise rate. More specifically, the air blower is set to be switched off at a lower stack voltage if the stack voltage rise rate is higher (see the inclined line on the right-side plane).

Controlling the switching-on/off of the air blower according to the stack voltage and the stack voltage rise/drop rate in the above manner offers the following advantages. First, by controlling the air blower to be switched off at a lower stack voltage at a higher stack voltage rise rate, the voltage of the fuel cell stack can be prevented from far exceeding a predetermined maximum voltage. For instance, the voltage of the fuel cell stack exceeds the predetermined maximum voltage by 10 V or less. Moreover, by controlling the air blower to be switched on at a higher stack voltage at a higher stack voltage drop rate, vehicle acceleration response during switching-off of the air blower can be improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An on/off control method for an air blower of a fuel cell hybrid vehicle equipped with a fuel cell as a main power source and a supercapacitor as an auxiliary power source, the method characterized in that on/off times of the air blower are controlled by a control map so as to vary according to supercapacitor voltage and motor current based, wherein, in a case where the motor input current is smaller than 0 A, the map switches off the air blower at a lower supercapacitor voltage if motor regenerative current is higher during vehicle braking.

2. The method of claim 1, wherein, in a case where motor input current is 0 A, the map switches off the air blower if the supercapacitor voltage is greater than V1 and switches on the air blower if the supercapacitor voltage is smaller than V2 and, in a case where the motor input current is greater than 0 A, the map switches on the air blower at a higher supercapacitor voltage if the motor input current is higher during vehicle acceleration.

3. The method of claim 2, wherein, in a case where the motor input current is smaller than 0 A, the map switches off the air blower at a lower supercapacitor voltage if motor regenerative current is higher during vehicle braking.

4. An on/off control method for an air blower of a fuel cell hybrid vehicle equipped with a fuel cell as a main power source and a supercapacitor as an auxiliary power source, the method characterized in that on/off times of the air blower are controlled by a control map so as to vary according to supercapacitor voltage and motor current based, wherein, in a case where motor input current is 0 A, the map switches off the air blower if the supercapacitor voltage is greater than V1 and switches on the air blower if the supercapacitor voltage is smaller than V2 and, in a case where the motor input current is greater than 0 A, the map switches on the air blower at a higher supercapacitor voltage if the motor input current is higher during vehicle acceleration, and in a case where the motor input current is smaller than 0 A, the map switches off the air blower at a lower supercapacitor voltage if motor regenerative current is higher during vehicle braking.

* * * * *